United States Patent

Pieper et al.

[15] 3,673,256
[45] June 27, 1972

[54] 3-ENDO-METHYL-3-EXO(4'-METHYLPENTANALYL)-2-METHYLENEBICYCLO[2.2.1]HEPTANE AND PROCESS FOR PREPARING SAME

[72] Inventors: Kenneth M. Pieper, West Chester; Thomas W. Gibson, Colerain Township, Hamilton County, both of Ohio

[73] Assignee: The Procter & Gamble Company, Cincinnati, Ohio

[22] Filed: Sept. 3, 1969

[21] Appl. No.: 855,043

[52] U.S. Cl. ............................... 260/598, 252/522, 252/132, 252/89
[51] Int. Cl. ........................................................... C07c 47/38
[58] Field of Search ........................................ 260/598, 603 R

[56] References Cited

UNITED STATES PATENTS 3,444,216  5/1969  Parikh et al. ..................... 260/598 X

FOREIGN PATENTS OR APPLICATIONS 891,351  12/1943  France ............................... 260/598

OTHER PUBLICATIONS

Sathe et al., Indian Journal Chemistry, Vol. 4 (1966) pages 393–395

*Primary Examiner*—Bernard Helfin
*Attorney*—Julius P. Filcik

[57] ABSTRACT

The compound, 3-endo-methyl-3-exo(4'-methylpentanalyl)-2-methylenebicyclo[2.2.1]heptane, and a process for preparing this compound are disclosed. 3-endo-Methyl-3-exo(4'-methylpentanalyl)-2-methylenebicyclo[2.2.1]heptane is valuable as a perfume component.

6 Claims, No Drawings

3,673,256

3-ENDO-METHYL-3-EXO(4'-METHYLPENTANALYL)-2-METHYLENEBICYCLO[2.2.1]HEPTANE AND PROCESS FOR PREPARING SAME

FIELD OF THE INVENTION

This invention relates to the compound 3-endomethyl-3-exo(4'-methylpentanalyl)-2-methylenebicyclo[2.2.1]-heptane, a compound having a valuable sandalwood odor useful in perfume compositions and to a process for preparing 3-endo-methyl-3-exo(4'-methylpentanalyl)-2-methylenebicyclo[2.2.1]heptane from 3-endo-methyl-3-exo(4'methyl-5'-hydroxypentyl)-2-methylenebicyclo[2.2.1]heptane.

HISTORY OF THE INVENTION

East Indian sandalwood oil has heretofore been available only from East Indian sandalwood trees. This oil and various individual components of the oil are highly valued perfume bases and are used in large quantities by the perfume industry. The oil, however, is expensive and is in limited, and sometimes sporadic, supply. For this reason, a continuous effort has been made to synthesize the various components of sandalwood oil or similar synthetic materials which possess the desirable woody fragrance of sandalwood oil.

3-endo-Methyl-3-exo(4'-methylpentanalyl)-2-methylenebicyclo[2.2.1]heptane, dihydro-β-santalal, and the process for preparing dihydro-β-santalal represents a portion of an extensive scientific effort to prepare compounds having the valuable characteristics of sandalwood. Other processes and intermediate compounds involved in this effort relating to the synthesis of synthetic sandalwood oil components and specifically to the synthesis of dihydro-β-santalol, a starting material used in the process for preparing dihydro-β-santalal, are described in the following copending U.S. applications: Fanta and Erman, 3-endo-Methyl-3-exo(4'-methyl-5'-hydroxypentyl)norcamphor and 2-Methyl-5-bromopentanol, and Process for the Preparation of These Compounds, Ser. No. 717,360, filed Mar. 29, 1968 and now U.S. Pat No. 3,579,479; Fanta and Tetrahydropyranyl Tetrahydropryranyl Ether Compounds and Process for Preparation of These Compounds and 3-endo-Methyl-3-exo(4'-methyl-5'-hydroxypentyl)norcamphor, Ser. No. 717,384, filed Mar. 29, 1968 and now abandoned; Fanta and Erman, Preparation of 3-endo-Methyl-3-exo(4'-methyl-5'-hydroxypentyl)norcamphor from 2-Methyl-4-pentenol, Ser. No. 717,362, filed Mar. 29, 1968 and now U.S. Pat. No. 3,580,953; Fanta and Erman, Preparation of 3-endo-Methyl-3-exo-(4'-methyl-5'-hydroxypentyl)norcamphor from 2-Methyl-4-pentenol, Ser. No. 717,458, filed Mar. 29, 1968; Kretschmar, Fanta and Erman, Process for Preparing 3-endo-Methylnorcamphor from 2-Methylnorborn-2-ene, Ser. No. 731,653, filed May 23, 1968; Gibson, Kretschmar and Erman, Process for Preparing 3-Methylnorcamphor from 2-Methylmorborm-2-ene, Ser. No. 731,652, filed May 23, 1968; Fanta and Erman, Process for Preparing Dihydro-β-Santalol from 3-endo-Methyl-3-exo(4'-methyl-5'-hydroxypentyl)norcamphor Ser. No. 753,897, filed Aug. 20, 1968; Fanta and Erman, Process for Preparing Dihydro-βsantalol from 3-endo-Methyl-3-exo(4'-methyl-5'-hydroxypentyl)norcamphor, Ser. No. 779,233, filed Nov. 26, 1968; Kretschmar and Erman, Process for Preparing β-Santalol from 3-methylnorcamphor, Ser. No. 826,628, filed May 21, 1969; and Kretschmar and Erman, Process for Preparing β-Santalol from 3-Methylnorcamphor, Ser. No. 826,684, filed May 21, 1969.

SUMMARY OF THE INVENTION

This invention relates to dihydro-β-santalol, 3-endomethyl-3-exo(4'-methylpentanalyl)-2-methylenebicyclo-[2.2.1]heptane, which is a valuable synthetic perfume component having a desirable sandalwood odor. Dihydro-β-santalal has the structural formula shown below.

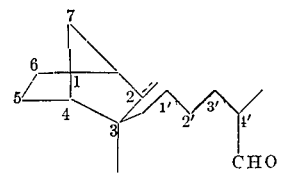

dihydro-β-santalal 3-endo-methyl-3-exo(4'-methylpentanalyl)-2-methylenebicyclo-[2.2.1]heptane

PROCESS FOR PREPARING DIHYDRO-β-SANTALAL

The process for preparing dihydro-β-santalal comprises the step of oxidizing dihydro-β-santalol, 3-endo-methyl-3-exo(4'-methyl-5'-hydroxypentyl)-2-methylenebicyclo[2.2.1]heptane with an oxidizing agent selected from the group consisting of chromic acid and chromium trioxide-pyridinium complex. The process can be summarized according to the equation shown below:

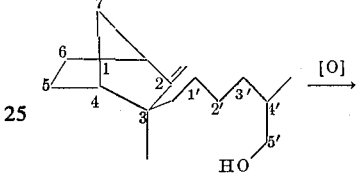

dihydro-β-santalol 3-endo-methyl-3-exo(4'-methyl-5'-hydroxypentyl)-2-methylenebicyclo[2.2.1]heptane

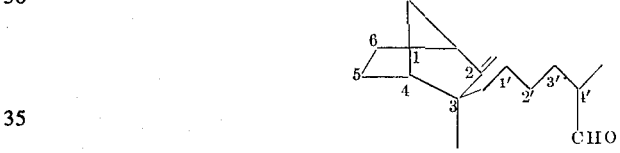

dihydro-β-santalal 3-endo-methyl-3-exo(4'-methyl-pentanalyl)-2-methylenebicyclo-[2.2.1]heptane Dihydro-β-santalal, the product of the above process and the novel compound described in this invention possesses a desirable, woody sandalwood fragrance, and has utility as a perfume component.

The initial starting compound used in the process of this invention is dihydro-β-santalol. Processes for preparing this compound from commercially available starting materials are described in the following copending U.S. Pat. applications: Fanta and Erman, 3-endo-Methyl-3-exo(4'-5'-hydroxyphentyl)norcamphor and 2-Methyl-5-bromopentanol, and Process for the Preparation of These compounds, Ser. No. 717,360, filed Mar. 29, 1968; Fanta and Erman, Tetrahydropyranyl Ether Compounds and Process for the Preparation of These Compounds and 3-endo-Methyl-3-exco(4'-methyl-5'-hydroxypentyl)norcamphor, Ser. No. 717,384, filed Mar. 29, 1968; Fanta and Erman, Preparation of 3-endo-Methyl-3-exo(4'-methyl-5'-hydroxypentyl)-norcamphor from 2-methyl-4-pentyl, Ser. No. 717,362, filed Mar. 29, 1968; Fanta and Erman, Preparation of 3-endo-Methyl-3-exo(4'-methyl-5'-hydroxypentyl)norcamphor, Ser. No. 717,374, filed Mar. 29, 1968; and Fanta and Erman, Process for Preparing Dihydro-β-Santalal from 3-endo-Methyl-3-exo(4'-methyl-5'-hydroxypentyl)norcamphor, Ser. No. 779,233, filed Nov. 26, 1968.

The process for preparing dihydro-β-santalal described herein comprises reacting dihydro-β-santalol whose structural formula is shown above with an oxidizing agent selected from the group consisting of chromic acid and chromium trioxide-pyridinium complex. The hydroxyl functional group of the side chain is oxidized to a carbonyl group.

A reaction mixture comprising dihydro-β-santalol in a solvent is generally prepared. Examples of solvents which can be used are ketones, such as acetone, methyl ethyl ketone and pentanone, aromatic hydrocarbon solvents, such as benzene, xylene or toluene and chlorinated hydrocarbon solvents, such as methylene chloride, methyl chloride, carbon tetrachloride and chloroform. Mixtures of these solvents, e.g., in a 1:1 weight ratio are also suitable. Methylene chloride and a mixture of acetone and benzene in a 1:1 weight ratio are the preferred solvents. Generally the solvent is used in a weight ratio to the dihydro-β-santalol of from 1:1 to 1,000:1 preferably 20:1 to 100:1.

The oxidizing agents suitable for use in the process of this invention are chromic acid and chromium trioxide-pyridinium complex. These oxidizing agents are described separately hereinafter.

Where chromic acid is used as the oxidizing agent it is prepared by mixing chromium trioxide with a mineral acid such as sulfuric acid. When sulfuric acid is used as the mineral acid a molar ratio of from 1:1.5 to 1:3 of chromium trioxide to sulfuric acid is usually used. An aqueous solution of the chromium trioxide/sulfuric acid mixture is then prepared by mixing the chromium trioxide/sulfuric acid mixture with water in a concentration range of 0.5 to 5 molar. This aqueous mixture is then generally added dropwise to the dihydro-β-santalol/solvent mixture with stirring, e.g., titrated into the dihydro-β-santalol/solvent mixture. The chromium trioxide oxidizing agent is generally used in the correct stoichiometric molar ratio to the dihydro-β-santalol, i.e., 1:1.5. An excess is not preferred so as to minimize oxidation of the aldehyde functional group of the dihydro-β-santalal to a carboxylic acid functional group.

Where chromium trioxide-pyridinium complex is used the oxidizing agent generally is prepared by dissolving chromium trioxide in pyridine in a weight ratio of from 1:5 to 1:20 of chromium trioxide to pyridine. The chromium trioxide-pyridinium complex formed is recrystallized from the solution and is then dissolved in a solvent in a weight ratio of from 1:1 to 1:1,000 preferably from 1:20 to 1:100 for use in the process for preparing dihydro-β-santalal. Suitable such solvents for use are aromatic hydrocarbon solvents such as benzene, xylene and toluene or chlorinated hydrocarbon solvents such as methylene chloride and chloroform. Mixtures of these solvents can be used where desired, e.g., in a 1:1 weight ratio. Methylene chloride is the preferred solvent where the chromium trioxide-pyridinium complex is used as the oxidizing agent. Where the chromium trioxide-pyridinium complex is used, it generally is used in a 6:1 to 20:1 molar ratio to the dihydroβ-santalol, preferably in a 6:1 to 10:1 molar ratio.

The oxidizing agents are generally added to the solvent mixture containing the dihydro-β-santalol in a dropwise manner. The solution normally is cooled in order to prevent excess heating on reacting and to control the reaction temperature more easily. Dropwise addition with stirring is preferred because localized concentration of oxidizing agents which could lead to degradation and production of by-products is minimized.

The reaction is normally an instantaneous one and temperatures around room temperature or below, e.g., −20° to 30° C., can be used and are generally preferred. However, temperatures ranging from −70° to 50 ° C. can be used where desired. The process can be performed in air and it is not necessary to conduct the reaction in an inert atmosphere. An inert atmosphere of argon or helium can be used where desired.

Generally the reaction proceeds during the addition of the oxidizing agent. Additional stirring can be used where desired, however, since the reaction is essentially instantaneous additional stirring is of no real advantage in increasing the yields of dihydro-β-santalal obtained. Generally the time of the reaction will range from less than 5 minutes to approximately an hour depending upon the amount of dihydro-β-santalal to be oxidized and the concentrations used.

Once the reaction has been completed dihydro-β-santalal is obtained. Separation of the dihydro-β-santalal can be obtained by conventional techniques, e.g., distillation of the reaction mixture or separation of the product from the reaction mixture by fractional crystallization or column chromatography.

Dihydro-β-santalal prepared as described above, the highly desirable and useful odor properties characterized as strong sandalwood. Dihydro-β-santalal can be used as a component of perfume compositions for ultimate use in products such as soaps, detergents, deodorants, and the like. Perfume compositions containing odoriferously effective amounts, e.g., 0.001 to about 50 percent of dihydro-β-santalal, are desirable and useful. More specific illustrations of the perfume utility of this compound are found in Examples II to IV given hereinafter.

EXAMPLES

The following examples illustrate the specific embodiments of this invention and are not intended to be limiting. All percentages and ratios in the following examples as well as in the specification and the appended claims are by weight unless otherwise indicated. The temperatures are expressed in degrees centigrade. Boiling points are not corrected.

Data listed in all the examples were obtained by means of the following techniques unless otherwise indicated. Infrared spectra were determined on a Perkin-Elmer Model 137 Infracord spectraphotometer. Nuclear magnetic resonance (nmr) spectra were determined in carbon tetrachloride with a Varian Model HA–100 spectrometer with tetramethylsilane (10τ) as an internal reference. The nmr data are in the odor chemical shift, integration, multiplicity, coupling constant (in Hz), and assignment.

EXAMPLE I

Preparation of 3-endo-methyl-3-exo(4′-methylpentanalyl)-2-methylenebicyclo[2.2.1]heptane A. Preparation of starting material, dihydro-β-santalol The starting compound for this preparation, dihydro-β-santalol, was prepared according to the process set forth in Example 1 of U.S. Pat. No. 3,579,479. In this process, commercially available 2-methyl-4-pentenol is borated with boric acid to form tri(2-methyl-4-pentenyl)borate. The borate is hydrobrominated by free radical addition and then hydrolyzed to obtain 2-methyl-5-bromopentanol. The 2-methyl-5-bromopentanol is borated with boric acid and, subsequently, this product is reacted with the enolate of 3-methylnorcamphor and then hydrolyzed to form 3-endo-methyl-3-exo(4′-methyl-5′-hydroxypentyl)norcamphor. 3-Methylnorcamphor was prepared according to the process described in the patent application of Gibson, Kretschmar and Erman, for Process for Preparing 3-Methylnorcamphor from 2-methylnorborn-2-ene, Ser. No. 731,653, filed May 23, 1968, by reacting methylcyclopentadiene dimer and ethylene according to the method of Alder and Ache, Chem. Ber. 95, p. 503 (1962) to obtain 2-methylnorborn-2-ene. The 2-methylnorborn-2-ene was then reacted with a peracid such as perbenzoic acid and subsequently with a catalytic amount of a Lewis or mineral acid to obtain 3-methylnorcamphor. The 3-endo-methyl-3-exo(4′-methyl-5′-hydroxypentyl)norcamphor is then used as an intermediate in the process described in the copending U.S. patent application of Fanta and Erman, having Ser. No. 779,233 filed Nov. 26, 1968, entitled Process for Preparing Dihydro-β-santalol from 3-endo-Methyl-3-exo(4′-methyl-5′-hydroxypentyl)norcamphor, Example I, pages 12 to 15. In the disclosure therein the 3-endo-methyl-3-exo(4′-methyl-5′-hydroxypentyl)norcamphor is borated to obtain the borate ester, tri[3-endo-methyl-3-exo(4′-methyl-5′-hydroxypentyl)norcamphor]borate. This borate ester is then reacted in strong base with a phosphorus compound, such as methyltriphenylphosphonium bromide, and hydrolyzed to obtain dihydro-β-santalol.

B. Preparation of dihydro-β-santalol

A 11.1 g. sample of dihydro-β-santalol prepared as described above was dissolved in 400 ml. of acetone and titrated at 0° C. with a 2.67 molar solution of chromium trioxide in aqueous sulfuric acid (4.1 M) according to the method of A. Bowers et al., J. Chem. Soc., 2548 (1953). A small amount of isopropyl alcohol was added to destroy any excess oxidant, and most of the solvent was removed under vacuum.

The residue was washed with ether (three times). The ether extracts were separated and combined. After washing the ether extracts with base, distillation of the reaction mixture gave 3 g. of dihydro-β-santalal (b.p. 105°–115° C. at 0.15 mm. Hg). Six grams of a 1:1 mixture of the starting alcohol and dihydro-β-santalal (b.p. 115° C. at 0.15 mm. Hg) were also obtained resulting in a 54 percent yield of dihydro-62 -santalal.

An analytical sample of dihydro-β-santalal was obtained by collecting a sample from an Aerograph Model 202–1B gas chromatograph containing a 5ft. × ¼ inch, 20 percent SE–30 stainless steel column. This purified material gave $\lambda_{max}$ 5.85 6.04, and 11.4μ and nmr signals at τ9.0 (3H, s), 8.96 (3H, d, J = 6.6 Hz), 5.59 (1H, s), 5.31 (1H, s), 0.39 (1H, d, J = 2 Hz). A mass spectrum of the compound on an Atlas SM–1 spectrometer gave a molecular weight of 220 when a cold temperature inlet was utilized.

When in the above examples other oxidizing agents, e.g., chromium trioxide-pyridinium complex, are substituted on an equivalent basis of the chromium trioxide in aqueous sulfuric acid used above, substantially similar results are obtained in that dihydro-β-santalol is oxidized to dihydro-β-santalal. When in the above example other solvents are used, e.g., aromatic hydrocarbon solvents such as methylene chloride, chloroform or carbon tetrachloride and mixtures of these solvents in a 1:1 weight ratio, are substituted on an equivalent basis for the acetone used substantially similar results are obtained in that dihydro-β-santalol is oxidized to dihydro-β-santalal.

EXAMPLE II

Perfume Compositions

Perfume compositions containing dihydro-β-santalal are prepared by mixing the components shown below in the amounts indicated. The compositions exhibit highly desirable and useful odors.

Composition A—Narcissus

| Component | Percent by Weight |
|---|---|
| Dihydro-β-santalol | 8.00 |
| Dihydro-β-santalal | 2.00 |
| Neroli oil | 4.00 |
| Vetivert oil | 12.50 |
| Isobutyl salicylate | 14.50 |
| Phenylacetic aldehyde | 5.00 |
| Paracresyl acetate | 20.00 |
| Ylang ylang | 8.50 |
| Heliotropin | 5.50 |
| Cinnamic alcohol | 20.00 |

Composition B—Chypre

| Component | Percent by Weight |
|---|---|
| Essence oakmoss | 5.00 |
| Bergamot oil | 22.50 |
| Vetivert oil | 7.50 |
| Oil of lavender | 5.00 |
| Dihydro-β-santalol | 6.00 |
| Dihydro-β-santalal | 1.00 |
| Patchouli | 1.00 |
| Clove bud oil | 3.50 |
| Jasmine complex | 10.00 |
| Rose complex | 8.00 |
| Isobutyl salicylate | 7.00 |
| Cinnamic alcohol | 5.00 |
| Heliotropin | 10.00 |
| Coumarin | 5.00 |
| Resin aroma of tonka bean | 2.00 |
| Methyl nonyl acetic aldehyde | 1.50 |

The components and proportions in the perfume compositions of this example can be adjusted according to methods well known in the perfume art to form a wide variety of desirable perfume compositions containing odoriferously effective amounts of these compounds

EXAMPLE III

Soap Bar Composition

A conventional household soap bar having the following composition is prepared:

| Component | Percent by Weight |
|---|---|
| Sodium soap | 75.0 |
| Potassium soap | 7.5 |
| (The total soap comprises a mixture of 80% tallow soap and 20% coconut soap) | |
| Water | 15.0 |
| Perfume composition A of Example II | 2.5 |
| TOTAL | 100.0 |

This soap bar exhibits a desirable narcissus fragrance. Composition B of Example I can be substituted for Composition A in the above soap bar composition to attain a chypre fragrance.

EXAMPLE IV

Detergent Composition

A conventional, granular, heavy-duty built detergent having the following composition is prepared:

| Component | Percent by Weight |
|---|---|
| Sodium dodecyl benzene sulfonate | 20.0 |
| Sodium tripolyphosphate | 50.0 |
| Sodium silicate (SiO$_2$:Na$_2$O ratio of 2:1) | 6.0 |
| Sodium sulfate | 14.0 |
| Water | 9.8 |
| Perfume composition A of Example II | 0.2 |
| TOTAL | 100.0 |

The detergent composition exhibits a desirable narcissus fragrance. Composition B of Example II can be substituted for Composition A to attain a highly desirable chypre fragrance.

What is claimed is:

1. 3-endo-Methyl-3-exo(4'-methylpentanalyl)-2-methylenebicyclo[2.2.1]heptane.

2. A process for preparing 3-endo-methyl-3-exo(4'-methylpentanalyl)-2-methylenebicyclo[2.2.1]heptane comprising oxidizing 3-endo-methyl-3-exo(4'-methyl-5'-hydroxypentyl)-2-methylenebicyclo[2.2.1]heptane with an oxidizing agent wherein said oxidizing agent is chromium trioxide-pyridinium complex.

3. The process of claim 2 wherein 3-endo-methyl-3-exo(4'-methyl-5'-hydroxypentyl)-2-methylenebicyclo[2.2.1]heptane is dissolved in a solvent in a molar ratio to the solvent of from 1:1 to 1:1,000.

4. The process of claim 3 wherein the chromium trioxide-pyridinium complex is prepared by dissolving chromium trioxide in pyridine in a weight ratio to pyridine of 1:5 to 1:20, recrystallizing the chromium trioxide-pyridinium complex, and subsequently dissolving the chromium trioxide-pyridinium complex in a solvent in a weight ratio to solvent of from 1:1 to 1:1,000.

5. The process of claim 4 wherein the chromium trioxide-pyridinium complex is used in a molar ratio to the 3-endo-methyl-3-exo(4'-methyl-5'-hydroxypentyl)-2-methylenebicyclo[2.2.1]heptane of 6:1 to 20:1.

6. The process of claim 5 wherein the reaction temperature ranges from −70° to 50° C.

* * * * *